United States Patent
Yamamoto et al.

(10) Patent No.: US 10,992,027 B2
(45) Date of Patent: Apr. 27, 2021

(54) ELECTRONIC DEVICE HAVING AN ANTENNA

(71) Applicant: LENOVO (SINGAPORE) PTE. LTD., Singapore (SG)

(72) Inventors: Osamu Yamamoto, Kanagawa (JP); Masayuki Amano, Kanagawa (JP); Sara Akiyama, Kanagawa (JP)

(73) Assignee: LENOVO (SINGAPORE) PTE LTD

( * ) Notice: Subject to any disclaimer, the term of this patent is extended or adjusted under 35 U.S.C. 154(b) by 0 days.

(21) Appl. No.: 16/747,193

(22) Filed: Jan. 20, 2020

(65) Prior Publication Data
US 2020/0243947 A1    Jul. 30, 2020

(30) Foreign Application Priority Data
Jan. 24, 2019  (JP) ................. JP2019-10572

(51) Int. Cl.
*H01Q 1/24* (2006.01)
*G06F 1/18* (2006.01)

(52) U.S. Cl.
CPC .......... *H01Q 1/243* (2013.01); *G06F 1/182* (2013.01)

(58) Field of Classification Search
CPC ....... H01Q 1/243; G06F 1/182; G06F 1/1658; G06F 1/1698; G06F 1/1616
See application file for complete search history.

(56) References Cited

U.S. PATENT DOCUMENTS

| | | | | |
|---|---|---|---|---|
| 8,665,160 B2* | 3/2014 | Uttermann | ........... | H01Q 1/2266 343/702 |
| 8,963,780 B2* | 2/2015 | Hsu | ........ | H01Q 5/378 343/700 MS |
| 9,131,037 B2* | 9/2015 | Corbin | .......... | H01Q 1/523 |
| 9,263,790 B2* | 2/2016 | Sanford | ............. | H01Q 1/526 |
| 9,326,396 B2* | 4/2016 | Mizoguchi | ............ | G06F 1/1658 |
| 10,014,582 B2* | 7/2018 | Ryu | ......... | H01Q 9/16 |
| 10,082,880 B1* | 9/2018 | Yarak, III | ............. | G06F 3/0231 |
| 10,218,052 B2* | 2/2019 | Pascolini | ............. | H01Q 21/30 |
| 10,601,135 B2* | 3/2020 | Yang | ............ | H01Q 1/243 |
| 10,680,336 B2* | 6/2020 | Zhong | ............. | H01Q 5/371 |
| 2014/0098502 A1* | 4/2014 | Lasarov | ............. | H04M 1/0283 361/752 |
| 2014/0112511 A1* | 4/2014 | Corbin | ............. | H05K 9/006 381/333 |
| 2019/0173158 A1* | 6/2019 | Azad | ............. | H01Q 13/10 |

FOREIGN PATENT DOCUMENTS

| | | |
|---|---|---|
| CN | 101222531 A | 7/2008 |
| CN | 107517551 A | 12/2017 |
| CN | 107978860 A | 5/2018 |
| JP | 2006304037 A | 11/2006 |
| JP | 2018-013974 A | 1/2018 |

* cited by examiner

*Primary Examiner* — Rockshana D Chowdhury
(74) *Attorney, Agent, or Firm* — Antony P. Ng; Russell Ng PLLC

(57) ABSTRACT

An electronic device is disclosed. The electronic device includes an antenna module having an antenna, and a body chassis storing electronic components. The body chassis, which is made of an electromagnetic shielding material such as metal, has a flat plate with a processor arranged thereon and with a cutout portion formed at an end portion thereof, a rear plate connected to the end portion of the flat plate, and a dent wall connected to the cutout portion and to the rear plate. The antenna module is provided in an antenna section whose front, left, and right sides are enclosed by the dent wall.

13 Claims, 6 Drawing Sheets

ELECTRONIC DEVICE HAVING AN ANTENNA

PRIORITY CLAIM

The present application claims benefit of priority under 35 U.S.C. §§ 120, 365 to the previously filed Japanese Patent Application No. JP2019-10572 with a priority date of Jan. 24, 2019, which is incorporated by reference herein.

TECHNICAL FIELD

The present invention relates to electronic devices in general, and in particular to an electronic device including an antenna.

BACKGROUND

An electronic device such as a laptop personal computer (laptop PC) includes a body chassis with a keyboard device and a display chassis with a display. The display chassis is configured to be rotatable via a hinge with respect to the body chassis. A laptop PC is also equipped with an antenna for various wireless communications via a wireless wide-area network (WWAN), a wireless local-area network (WLAN), etc. Conventionally, the antenna is often provided on the frame of the display chassis.

The present disclosure provides an electronic device capable of securing electromagnetic noise shielding and increasing radio wave transmitting and receiving performance for an antenna within the electronic device.

SUMMARY

In accordance with an embodiment of the present disclosure, an electronic device includes an antenna module having an antenna, and a chassis for storing electronic components. The chassis has a flat plate with a cutout portion formed at an end portion, a side panel connected to the end portion of the flat plate, and a dent wall connected to the cutout portion and to the side panel. The antenna module is provided in an antenna section enclosed by the dent wall on three sides.

The antenna module may have a base portion made of radio wave transmitting material, and the base portion may have a first surface, which forms a surface extended from an outer surface of the flat plate, and a second surface, which forms a surface extended from an outer surface of the side panel. According to the first and second surfaces, a sense of unity with the chassis is achieved on design. Moreover, the base portion is made of radio wave transmitting material, thereby enabling radio waves to be transmitted or received via the base portion.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

With the upsizing of a display screen of a laptop PC and the downsizing the overall dimensions of the laptop PC, a thin frame (narrow bezel) is being used more frequently, which makes it difficult to secure a space for installing an antenna in a display chassis of the laptop PC. Thus, a structure as illustrated in FIG. 6 has been considered.

Figure 6:
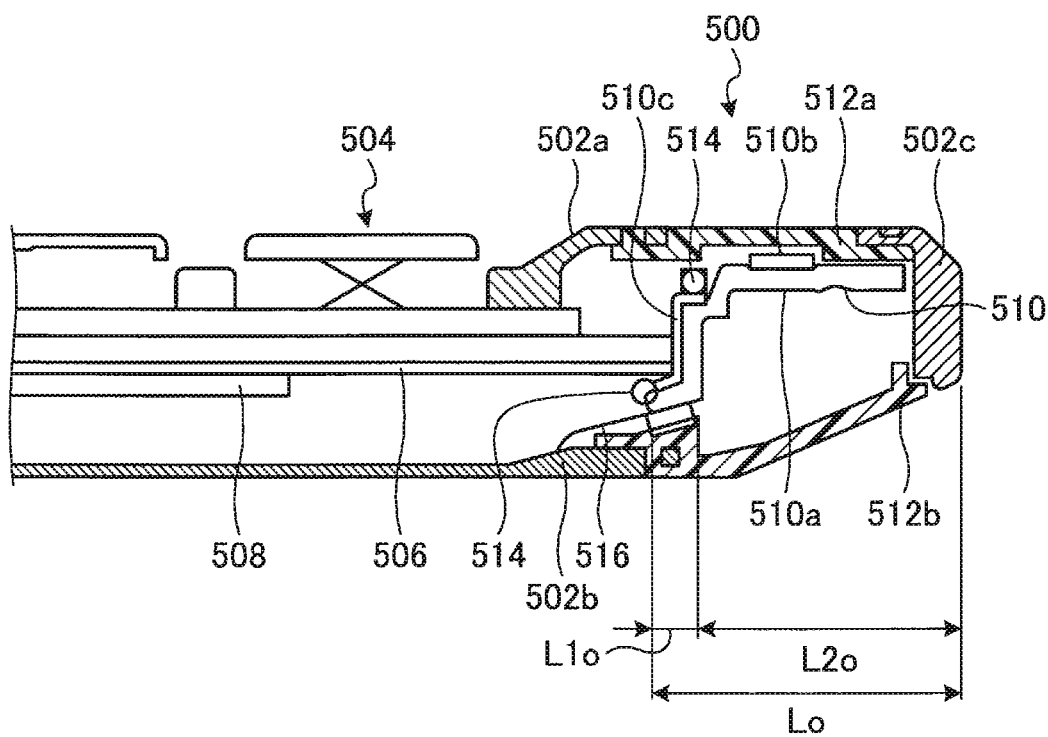
FIG. 6 is a sectional side view of a body chassis in a comparative example.

FIG. 6 is a sectional side view of a body chassis 500 of an electronic device. As illustrated in FIG. 6, the body chassis 500 is configured based on a top cover 502a, a bottom cover 502b, and a side cover 502c, including a keyboard device 504 on the upper surface and a substrate 506 in the inside. On the substrate 506, there is mounted an electronic component 508, which is a noise source. The top cover 502a, the bottom cover 502b, and the side cover 502c are each made of metal material, which is ground connected, shielding radio waves.

An antenna module 510 is provided at an end portion of the body chassis 500. A section in which the antenna module 510 is provided is enclosed by a radio wave transmitting material 512a in the upper part and a radio wave transmitting material 512b in the lower part so as to be able to transmit and receive radio waves. The radio wave transmitting material 512a connects the top cover 502a and the side cover 502c, and the radio wave transmitting material 512b connects the bottom cover 502b and the side cover 502c.

A base portion 510a of the antenna module 510 has an irregular L-shaped cross section according to the internal shape of an area in which the base portion 510a is arranged. An antenna 510b is provided on the upper surface of the base portion 510a and a shield wall 510c is provided on a side surface close to the substrate 506. The upper and lower ends of the shield wall 510c are each connected to the inner surface of the chassis via a conductive sponge 514. The shield wall 510c is ground connected to the bottom cover 502 via copper tape 516.

In this type of body chassis 500, the electronic component 508 is electromagnetically separated from the antenna 510b by the shield wall 510c and the conductive sponge 514, thereby reducing failures in communication of the antenna 510b caused by electromagnetic noise, which is generated by the electronic component 508.

In this type of body chassis 500, however, it is necessary to provide the side cover 502c made of metal from the viewpoint of strength, and therefore it is difficult to transmit or receive radio waves at least to the right in FIG. 6. In addition, assuming that a dimension L1o for installing the shield wall 510c is large and that L2o indicates the dimension for securing antenna performance plus the dimension of the side cover 502c, the total dimension Lo (=L1o+L2o) required to install the antenna module 510 is large. Furthermore, the base portion 510a has a complicated shape due to space constraints and further requires the shield wall 510c, the conductive sponge 514, the copper tape 516, the radio wave transmitting materials 512a and 512b, and the like, thus having a large number of parts.

Figure 1:
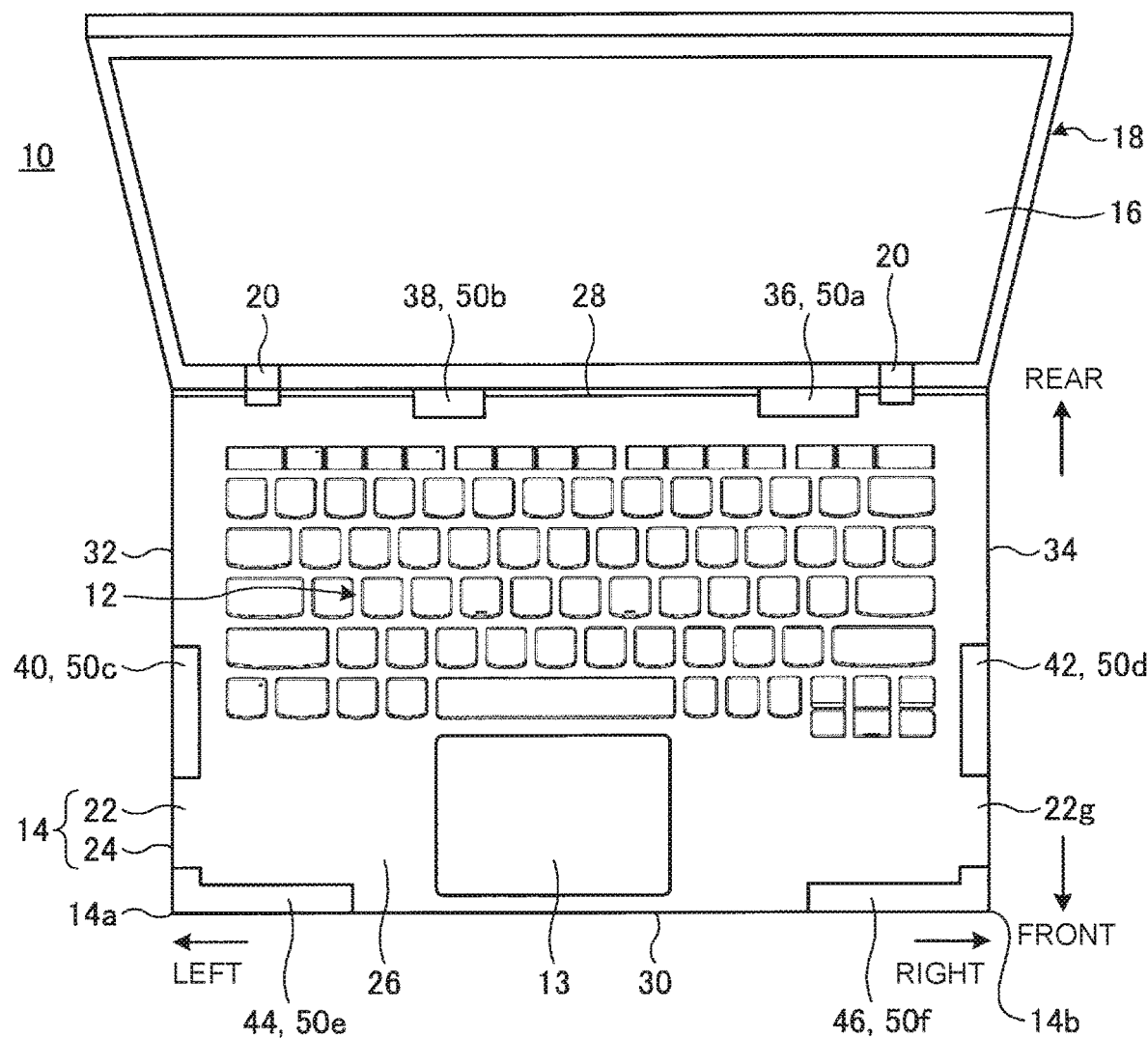
FIG. 1 is a plan view of an electronic device, according to one embodiment.

Referring now to FIG. 1, there is illustrated a plan view of an electronic device 10, according to one embodiment. In this embodiment, a laptop PC is illustrated as the electronic device 10. The electronic device 10 may be a desktop PC, a tablet PC, or the like.

As illustrated in FIG. 1, the electronic device 10 includes a body chassis 14, which includes a keyboard device 12 and a touchpad 13, and a display chassis 18 with a display device 16. The display chassis 18 is rotatably connected to a rear end portion of the body chassis 14 via a pair of right and left hinges 20 and 20. The display device 16 is, for example, a liquid crystal display.

FIG. 1 is a diagram of the electronic device 10 viewed down from above in a use state where the display chassis 18 is opened from the body chassis 14 via the hinges 20. Hereinafter, the body chassis 14 will be described by referring to the front side as "front," the far side as "rear," the thickness direction as "top and bottom (vertical)," and the width direction as "right and left (horizontal)," based on the direction of viewing the display device 16 of the electronic device 10 from the front in the use state illustrated in FIG. 1. Moreover, the body chassis 14 and respective parts mounted thereon will be described in a state where the body chassis 14 is viewed in a plan view, by referring to the side closer to the center than the outer peripheral side as "inside" and the side outer than the center side as "outside." These directions are used for convenience of description. Therefore, according to the arrangement or installation postures of respective parts of a product or the like, for example, the vertical direction and the horizontal direction described above may be reversed in some cases.

The body chassis 14 is a thin box-shaped chassis, which is formed by a top cover 22 and a bottom cover 24. The top cover 22 is a plate-shaped member that forms the upper surface and surrounding side surfaces of the body chassis 14. The bottom cover 24 is a plate-shaped member that forms the bottom surface of the body chassis 14. The top cover 22 and the bottom cover 24 are formed of metal material (for example, magnesium alloy) or of electromagnetic shielding material such as a carbon plate. The top cover 22 and the bottom cover 24 are electrically ground connected and have a shielding performance from electromagnetic noise.

The top cover 22 has a flat plate 26, which forms the most part excluding the keyboard device 12 and the touchpad 13 on the upper surface, a rear plate 28 standing downward from around the flat plate 26, a front plate 30, a left plate 32, and a right plate 34. The top cover 22 is formed by, for example, die-casting, and the flat plate 26, the rear plate 28, the front plate 30, and the left plate 32 are integrally molded. The bottom cover 24 is a thin flat plate and covers the entire lower surface of the body chassis 14.

The body chassis 14 is equipped with six antenna modules 36, 38, 40, 42, 44, and 46. The antenna modules 36, 38, 40, 42, 44, and 46 are provided in antenna sections 50a, 50b, 50c, 50d, 50e, and 50f formed in the body chassis 14, respectively.

The antenna section 50a is provided in a slightly right position in the body chassis 14 along the rear plate 28. The antenna section 50b is provided in a slightly left position in the body chassis 14 along the rear plate 28. The antenna sections 50a and 50b each have a rectangular shape, which is long in the horizontal direction in a plan view, and are provided in a narrow area behind the keyboard device 12.

The antenna section 50c is provided along the left plate 32. The antenna section 50d is provided along the right plate 34. The antenna sections 50c and 50d each have a rectangular shape, which is long in the anteroposterior direction in a plan view, and are provided in a narrow area in the outer side of the keyboard device 12. In the body chassis 14, the antenna section 50c is provided on the left side and the antenna section 50d is provided on the right side.

The antenna section 50e is provided in a portion including a front left corner 14a in the body chassis 14. The antenna section 50f is provided in a portion including a front right corner 14b in the body chassis 14. The antenna sections 50e and 50f are each substantially L-shaped in a plan view.

Figure 2:
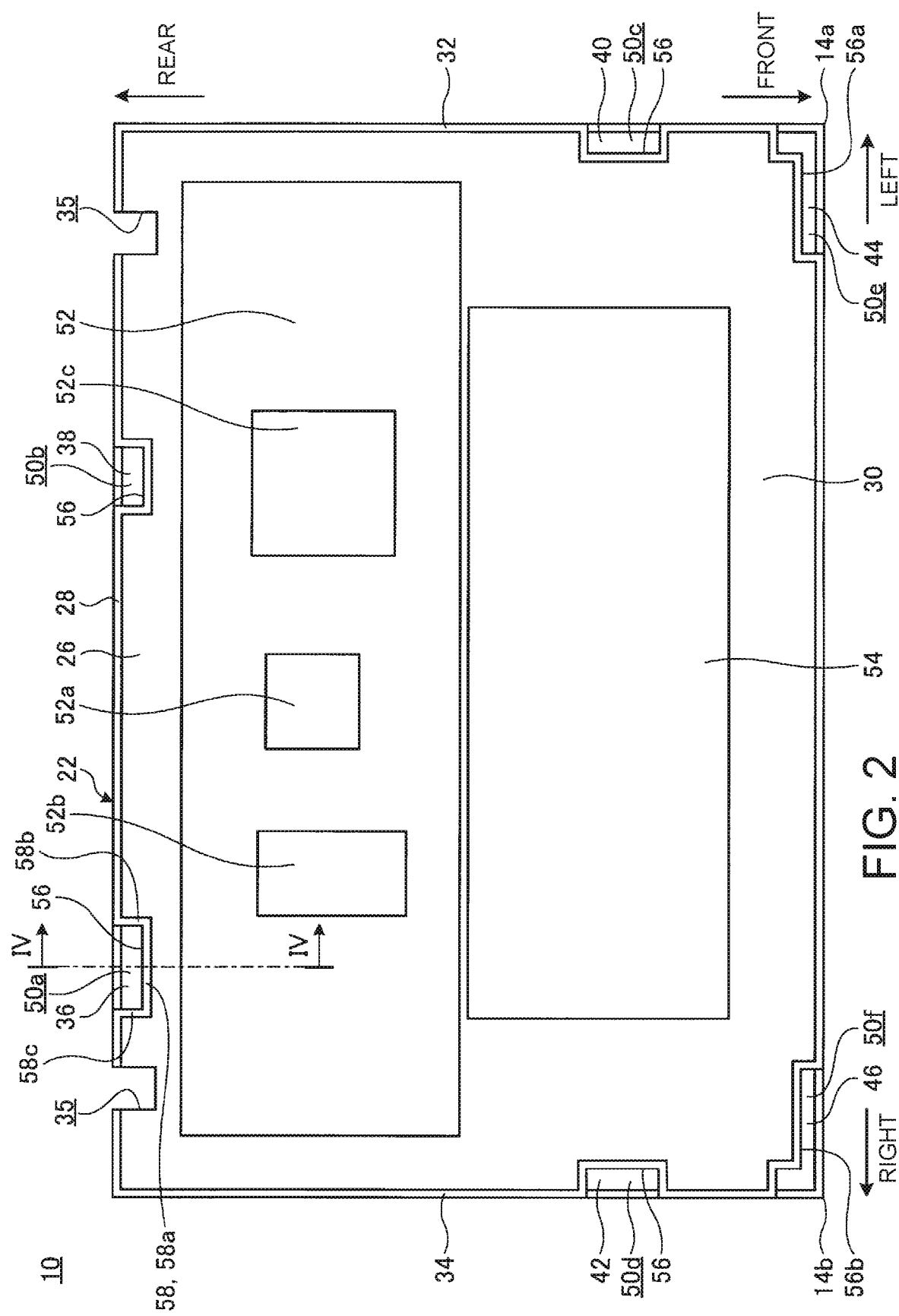
FIG. 2 is a bottom view of an internal structure of a body chassis of the electronic device from FIG. 1.

With reference now to FIG. 2, there is depicted a bottom view of an internal structure of the body chassis 14 and is a diagram in which the inside of the body chassis 14 is viewed from the inside of the top cover 22 with the bottom cover 24 removed.

As illustrated in FIG. 2, the body chassis 14 contains a substrate 52 and a battery device 54 inside. The body chassis 14 further contains a cooling module, a hard disk drive, and the like, which are not illustrated. A reference number 35 in FIG. 2 indicates a recessed portion in which the hinge 20 is arranged.

The substrate 52 is a motherboard of the electronic device 10. The substrate 52 is a printed circuit board (PCB) on which there are mounted various electronic components such as, for example, a CPU 52a, a power circuit 52b, a memory 52c, and the like. Although the electronic components including the CPU 52a on the substrate 52 operate on the basis of high clock frequency and thereby may generate electromagnetic noise, a dent wall 58 described later reduces failures in communication of the antenna modules 36, 38, 40, 42, 44, and 46.

The flat plate 26 has a rectangular cutout portion 56 formed in the position of the antenna section 50a at the rear end. Also in the positions of the antenna sections 50b to 50d, the same cutout portions 56 are formed. In the positions of the antenna sections 50e and 50f, cutout portions 56a and 56b, which are L-shaped in a plan view, are formed according to the shapes of the antenna sections 50e and 50f, respectively.

Figure 3:
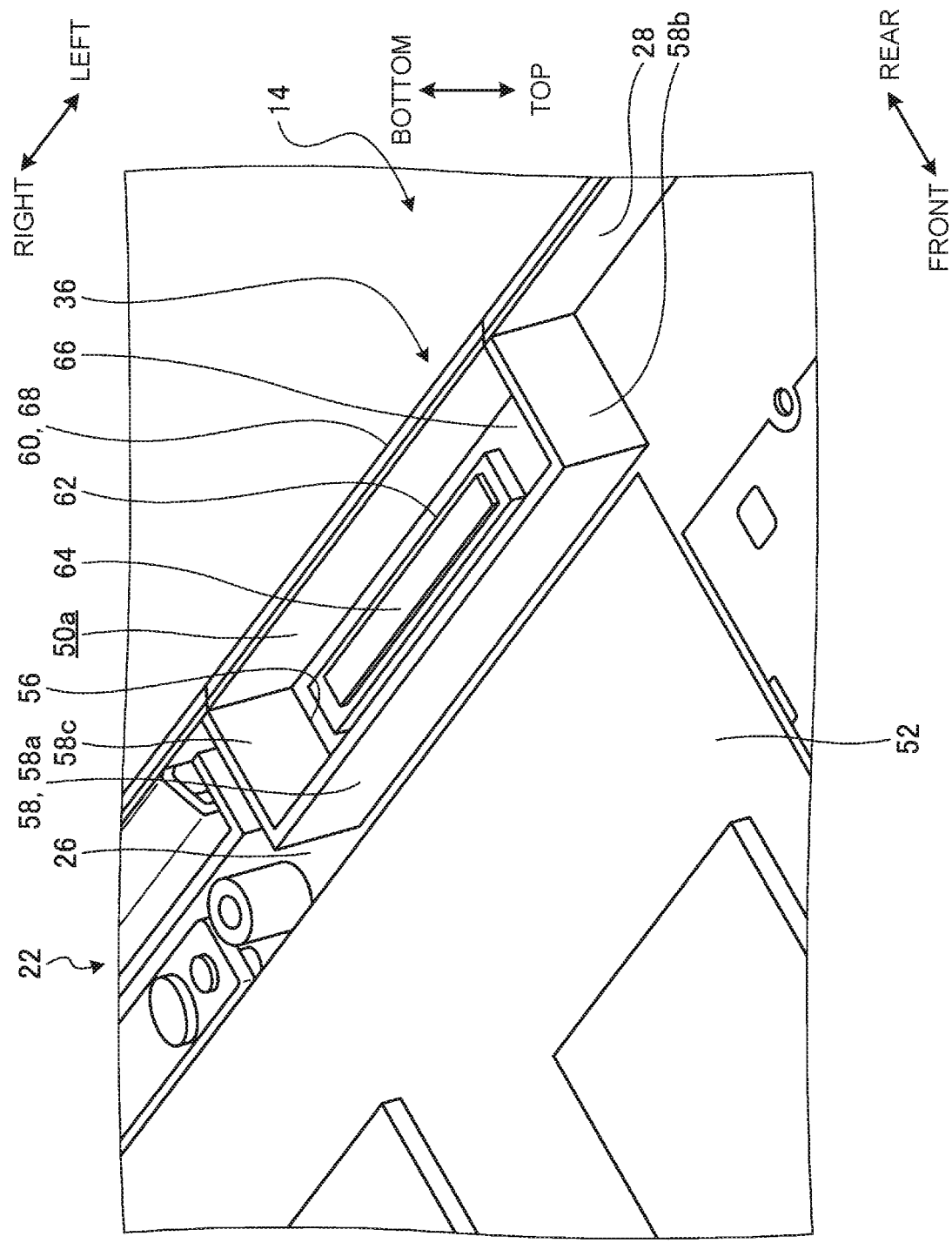
FIG. 3 is a perspective view of an antenna module, an antenna section, and a region therearound in the body chassis.
Figure 4:
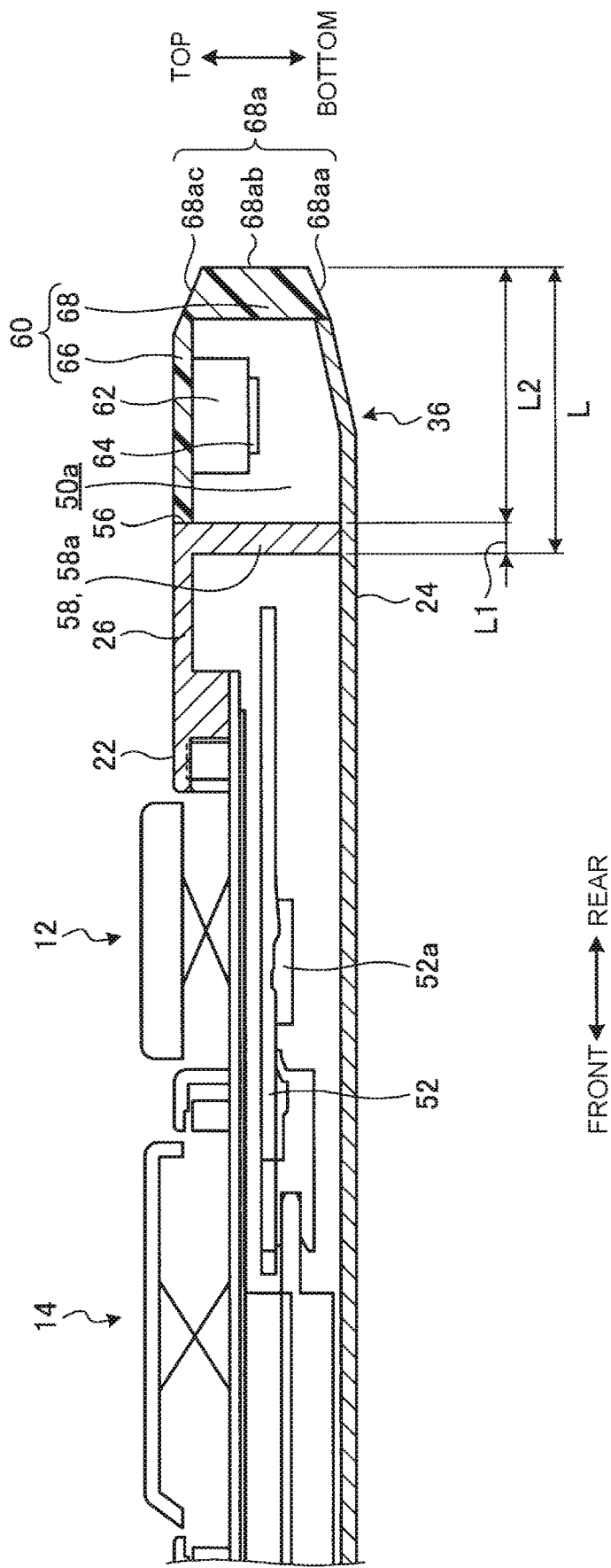
FIG. 4 is a sectional side view taken along line IV-IV of the body chassis in FIG. 2.

FIG. 3 is a perspective view of an antenna module 36, an antenna section 50a, and a region therearound in the body chassis 14. In FIG. 3, the bottom cover 24 is omitted so as to make the inside visible. FIG. 4 is a sectional side view taken along line IV-IV of the body chassis 14 in FIG. 2.

As illustrated in FIGS. 3 and 4, the top cover 22 has a dent wall 58 standing downward from the cutout portion 56. The dent wall 58 is integrally molded by die-casting or computerized numerical control (CNC) together with the flat plate 26 and the rear plate 28. The lower end portion of the dent wall 58 comes in contact with the inner surface of the bottom cover 24. In addition, the lower surface of the antenna section 50a is covered with the bottom cover 24. Although not illustrated, the dent wall 58 is provided with a small cutout for wiring connected to an antenna 64 described later.

The left wall 58b has an upper end connected to the left-hand side of the cutout portion 56 and a rear end connected to the end portion of the rear plate 28, covering the left side surface of the antenna section 50a. The right wall 58c has an upper end connected to the right-hand side of the cutout portion 56 and a rear end connected to the end portion of the rear plate 28, covering the right side surface of the antenna section 50a. The front wall 58a has an upper end connected to the front side of the cutout portion 56 and left and right ends connected to the front side of the left wall 58b and to the front side of the right wall 58c, respectively. The front wall 58a has a shape long in the horizontal direction, and the left wall 58b and the right wall 58c each have a rectangular shape close to a square.

The antenna section 50a is enclosed by a dent wall 58 on three sides (the left side, the right side, and the front side), and an antenna module 36 is provided in the antenna section 50a.

Figure 5A:
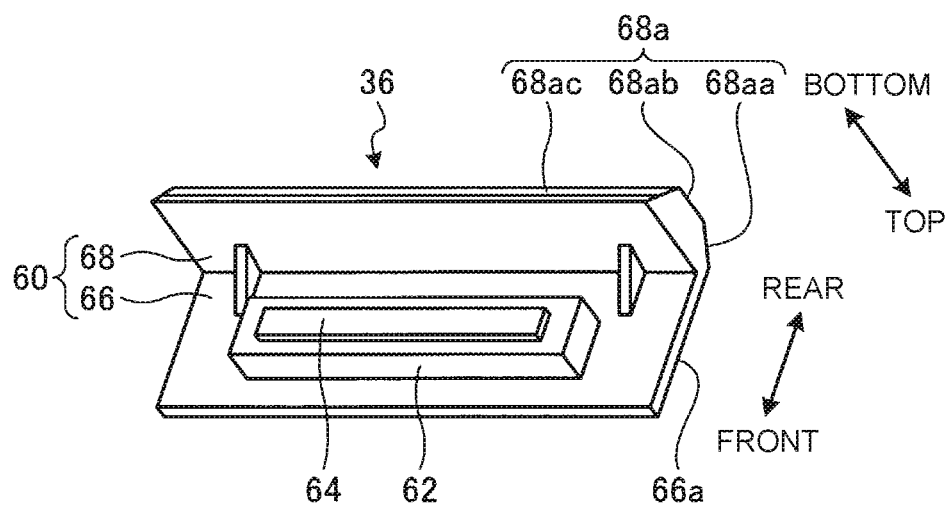
FIG. 5A is a perspective view of the antenna module from diagonally below.
Figure 5B:
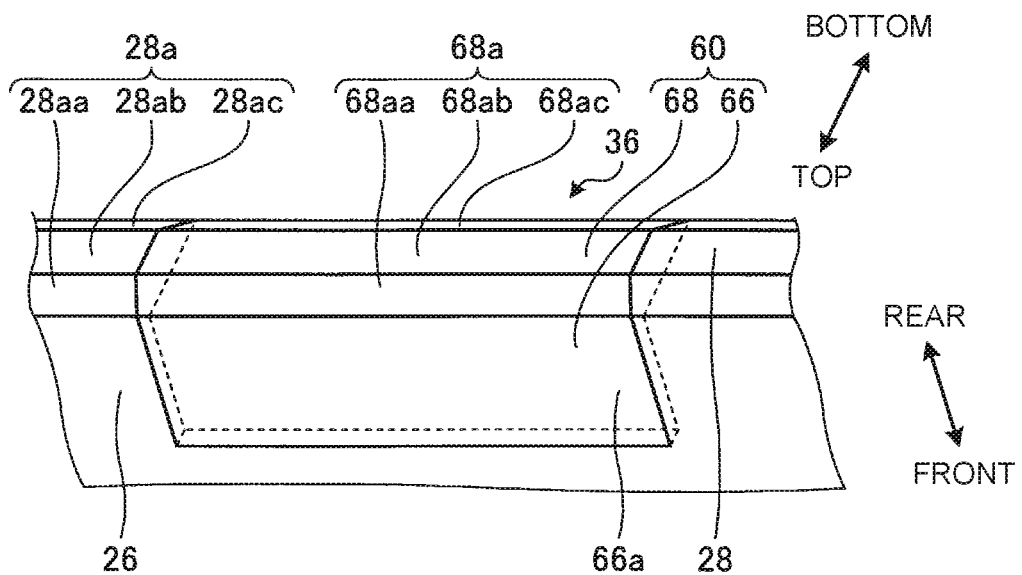
FIG. 5B is a perspective view of the antenna module from diagonally above.

FIG. 5A is a perspective view of the antenna module 36 viewed from diagonally below; and FIG. 5B is a perspective view of the antenna module 36 viewed from diagonally above. FIG. 5B also illustrates a part of the top cover 22. Incidentally, the antenna modules 38, 40, 42, 44, and 46 (see FIG. 2) have the same structure as the structure of the antenna module 36. Although the antenna modules 44 and 46 are each L-shaped in a plan view according to the shapes of the antenna sections 50e and 50f, the basic configuration is the same as the antenna module 36.

As illustrated in FIG. 5, the antenna module 36 has a base portion 60, a pedestal 62, and an antenna 64. The antenna 64 complies with the WWAN or WLAN wireless communication standard, for example.

The base portion 60 is made of radio wave transmitting material, having a top plate 66 and a rear plate (side panel) 68. The radio wave transmitting material is resin such as, for example, polyphenylene sulfide (PPS) or the like. The top plate 66 covers the upper surface of the antenna section 50a substantially without any gap, and the rear plate 68 covers the rear surface of the antenna section 50a substantially without any gap.

The rear plate 68 stands downward from the rear end of the top plate 66, and the base portion 60 is substantially L-shaped in a side view. The top plate 66 and the rear plate 68 are integrally connected to each other.

The outer surface (first surface) 66a of the top plate 66 forms a surface extended from the outer surface (namely, the upper surface) of the flat plate 26 in the antenna section 50a. The outer surface (the second surface) 68a of the rear plate 68 forms a surface extended from the outer surface (namely, the rear surface) 28a of the rear plate 28 in the antenna section 50a. The outer surface 28a of the rear plate 28 is formed of three surfaces of the top inclined surface 28aa, the middle surface 28ab, and the bottom inclined surface 28ac from the viewpoint of design. The top inclined surface 28aa is inclined diagonally backward from the end portion of the top plate 66. The bottom inclined surface 28ac is inclined diagonally backward from the end portion of the bottom cover 24. The middle surface 28ab is a vertical plane connecting the top inclined surface 28aa and the bottom inclined surface 28ac.

The outer surface 68a of the rear plate 68 has three surfaces, a top inclined surface 68aa, a middle surface 68ab, and a bottom inclined surface 68ac from top to bottom. The top inclined surface 68aa, the middle surface 68ab, and the bottom inclined surface 68ac form surfaces extended from the top inclined surface 28aa, the middle surface 28ab, and the bottom inclined surface 28ac, respectively.

The shape of the outer surface 28a of the rear plate 28 is not limited thereto. For example, the respective boundaries of the top inclined surface 28aa, the middle surface 28ab, and the bottom inclined surface 28ac may be connected to each other so as to be gently curved, or the outer surface 28a may have a shape in which the middle surface 28ab is not present almost at all. In this case, with respect to the top inclined surface 68aa, the middle surface 68ab, and the bottom inclined surface 68ac of the outer surface 68a of the rear plate 68, surfaces extended from these surfaces are preferably formed.

According to the outer surface 66a of the top plate 66 and the outer surface 68a of the rear plate 68 as described above, a sense of unity with the body chassis 14 is achieved on design.

The pedestal 62 is provided on the inner surface of the top plate 66, with the antenna 64 as an element fixed to the lower surface of the pedestal 62. The base portion 60 is made of radio wave transmitting material and therefore the antenna 64 is able to transmit or receive radio waves through the base portion 60. The antenna 64 may be mounted on the PCB on the pedestal 62. The pedestal 62 holds the antenna 64 in an appropriate position slightly apart from the outer surfaces of the top plate 66 and the rear plate 68, by which the specific absorption rate (SAR) criteria are met. SAR is an indicator of electric energy of radio waves absorbed by a human body. For example, in Japan, according to the Ordinance of the Ministry of Internal Affairs and Communications and Radio Equipment Regulations, a land mobile station that performs mobile wireless communication is required to hold a local SAR, which is an SAR of a specific part of a human body, down to a predetermined value or less. The pedestal 62 may be provided on the inner surface of the rear plate 68.

According to the electronic device 10 configured as described above, as illustrated in FIGS. 3 and 4, the dent wall 58 serves as an electromagnetic shielding wall, which separates the substrate 52 and the antenna module 36, thereby reducing failures, which may be caused by electromagnetic noise emitted from the CPU 26 or the like, in the communication of the antenna 64. The antenna section 50a, in which the antenna module 36 is arranged, is shielded from direct electromagnetic noise, which is emitted from the CPU 52a in front, by the front wall 58a and is shielded from electromagnetic noise (for example, reflected waves) from the lateral sides by the left wall 58b and the right wall 58c.

Furthermore, the dent wall 58 has an electromagnetic function of shielding electromagnetic noise and further a mechanical function of securing the strength of the antenna section 50a. Specifically, the end portion of the rear plate 28 is supported by the left wall 58b and the right wall 58c and therefore does not bend in an anteroposterior direction. In addition, the periphery of the cutout portion 56 of the flat plate 26 does not bend or twist in every direction since the front wall 58a, the left wall 58b, and the right wall 58c stand in the periphery and further the front wall 58a differ by 90 degrees in orientation from the right wall 58c and the left wall 58b.

Moreover, the dent wall 58 has a simple structure of standing from the cutout portion 56 in the top cover 22, which makes the lateral length L1 shorter.

Since the antenna section 50a has a strength maintained by the dent wall 58, it is unnecessary to provide a metal side cover 502c in the rear end portion as in a comparative example (see FIG. 6) and the rear plate 68 of the radio wave transmitting material forms a rear end portion. Therefore, the antenna 64 is able to transmit or receive radio waves also in the backward direction, thereby increasing the transmitting and receiving performance.

Furthermore, the dent wall 58 is integrally molded with the top cover 22 and therefore electrical continuity is secured, by which conduction means like the copper tape 516 is unnecessary. The antenna section 50a does not need the additional elements such as the shield wall 510c, the conductive sponge 514, and the radio wave transmitting materials 512a and 512b as in the comparative example, by which a simple structure is achieved. Therefore, the antenna module 36 is considerably simple in comparison with the antenna module 510 in the comparative example, thereby enabling the arrangement to be more backward (to the right side in FIG. 4) accordingly. Therefore, assuming that L2 (see FIG. 4) is the anteroposterior width of the antenna module 36, the total dimension L (=L1+L2) in the anteroposterior direction, which is assumed to be necessary to provide the antenna module 36, is able to be shorter than the total dimension L0 in the comparative example.

Although description has been made by giving an example of the antenna module 36 and the antenna section 50*a*, the same advantageous effects are achieved also with respect to the antenna modules 38, 40, 42, 44, and 46 and the antenna sections 50*b* to 50*f*. Naturally, the designations such as "front," "left," and "right" for the names of the aforementioned front wall 58*a*, left wall 58*b*, right wall 58*c*, and the like may vary according to location and orientation to be applied.

As has been described, the present invention provides an electronic device having an antenna. The electronic device is capable of securing electromagnetic noise shielding and increasing radio wave transmitting and receiving performance for the antenna within the electronic device.

While the invention has been particularly shown and described with reference to a preferred embodiment, it will be understood by those skilled in the art that various changes in form and detail may be made therein without departing from the spirit and scope of the invention.

What is claimed is:

1. An electronic device comprising:
   a plurality of antennae;
   a body chassis for storing electronic components, wherein said body chassis includes a plurality of antenna sections located at cutout portions along edges of said body chassis,
   wherein one of said antenna sections includes a section of a bottom cover of said body chassis,
   a front dent wall, and two side dent walls, connected to each other orthogonally; and an plurality of antenna modules for containing said plurality of antennae,
   wherein one of said antenna modules includes a base portion, and a pedestal for supporting one of said antennae,
   wherein said base portion is connected to said front and said two side dent walls;
   wherein said a base portion having includes a top plate connected to said front and said two side dent walls, and
   a rear plate connected to said top plate, said two side dent walls, and said bottom cover section of said body chassis.

2. The electronic device of claim 1, wherein said body chassis is made of an electromagnetic shielding material.

3. The electronic device of claim 2, wherein said electromagnetic shielding material is carbon.

4. The electronic device of claim 1, wherein said front and said two side dent walls are made of an electromagnetic shielding material.

5. The electronic device of claim 4, wherein said electromagnetic shielding material is carbon.

6. The electronic device of claim 1, wherein said rear plate has a first inclined surface, a second inclined surface, and a third inclined surface.

7. The electronic device of claim 1, wherein said base portion is made of a radio wave transmitting material.

8. The electronic device of claim 7, wherein said radio wave transmitting material is polyphenylene sulfide.

9. The electronic device of claim 1, wherein one of said antenna sections is located at a rear edge of said body chassis.

10. The electronic device of claim 1, wherein one of said antenna sections is located at a front edge of said body chassis.

11. The electronic device of claim 1, wherein one of said antenna sections is located at a side edge of said body chassis.

12. The electronic device of claim 1, wherein said body chassis includes a keyboard.

13. The electronic device of claim 12, wherein said body chassis is rotatably connected to a display chassis having a display.

* * * * *